United States Patent [19]

Eriksson

[11] 4,227,647
[45] Oct. 14, 1980

[54] DEVICE FOR COOLING CHIMNEY GASES

[76] Inventor: Leif Eriksson, Abrahamsbergsvagen 68, S-161 45, Bromma, Sweden

[21] Appl. No.: 908,220

[22] Filed: May 22, 1978

[30] Foreign Application Priority Data

May 25, 1978 [SE] Sweden ................ 7706116
Dec. 7, 1978 [SE] Sweden ................ 7713882

[51] Int. Cl.³ .................................... G05D 23/00
[52] U.S. Cl. .................... 237/2 B; 237/55; 122/20 B; 62/467 R
[58] Field of Search ............ 122/20 B; 237/2 B, 56, 237/55; 165/DIG. 2; 62/238 C; 110/215, 216

[56] References Cited

U.S. PATENT DOCUMENTS

| | | | |
|---|---|---|---|
| 1,402,045 | 1/1922 | Brunett | 122/20 B |
| 3,613,607 | 10/1971 | Hacker | 110/216 |
| 3,932,280 | 1/1976 | Anderson | 110/215 |
| 3,944,136 | 3/1976 | Huie | 237/55 |
| 4,024,908 | 5/1977 | Meckler | 62/467 |
| 4,037,567 | 7/1977 | Torres | 122/20 B |
| 4,043,320 | 8/1977 | Strew | 126/299 E |
| 4,103,493 | 8/1978 | Schoenfelder | 62/467 R |
| 4,123,003 | 10/1978 | Winston | 237/2 B |
| 4,141,490 | 2/1979 | Franchina | 237/55 |

FOREIGN PATENT DOCUMENTS

| | | | |
|---|---|---|---|
| 2291455 | 6/1976 | France | 237/2 B |
| 901564 | 7/1962 | United Kingdom | 62/238 C |

Primary Examiner—Henry C. Yuen
Attorney, Agent, or Firm—Hammond & Littell, Weissenberger and Muserlian

[57] ABSTRACT

The invention relates to a device for cooling chimney-gases in such plants, where water, heated in a heating boiler, is supplied to heat consumers; e.g. radiators. According to the invention, a condensor-heat exchanger is arranged downstream of the heat consumers, a chimney gas cooler is situated in the chimney gas channel from the heating boiler, whereby said condensor-heat exchanger and said chimney gas cooler are parts of a closed cooling system, containing e.g. freon gas, together with a refrigerating compressor and a throttle.

5 Claims, 2 Drawing Figures

DEVICE FOR COOLING CHIMNEY GASES

The present invention relates to a device for cooling chimney gases in such plants, where water, heated in a heating boiler, is supplied to heat consumers, e.g., radiators. The invention is applicable in connection with heating boilers in villas, residential blocks and boiler houses. Such heating boilers may be oil-fired or fired with other kinds of fuels. The primary object of the invention is to improve the heat economy of such heating plants or, in other words, to improving the efficiency of the heating boilers. A further object of the present invention is to reduce discharge of sulphur containing material to the atmosphere together with the chimney gas.

A still further object of the present invention is to solve the problem how to use the heat of the chimney gases to drive a refrigerating compressor.

A still further object of the invention is to provide means in order to use the heat of the chimney gases to drive the cooling compressor. This can be achieved by arranging a steam generator in the closed system, said steam generator feeding an expander device, where conversion into mechanical energy takes place in a conventional manner, and said last mentioned energy being used to drive the coiling compressor.

The chimney gas shall be cooled down to such low temperature, that the major part of the water vapour of the chimney gas is condensed and that the acid, sulphur containing combustion products of the chimney gas dissolve in the condensate water.

A heating boiler, being in very good trim, can have an efficiency up to 80-85%, but most heating boilers in villas reach an efficiency up to only 60-70%. The remaining energy is lost essentially in the form of warm chimney gases. If the chimney gases are cooled down to at least outdoor temperature and the heat energy of the chimney gases is used to heat supply of the actual house, the efficiency could be increased by 15-20%. If the chimney gases are cooled down as indicated, a chimney gas fan is required, since neither chimney nor chimney gas is warm.

When chimney gases are cooled down, the water vapour of said chimney gases are condensed and the main part of sulphur compounds in form of sulfurous acid, resulting from the oil combustion of the heating boiler, will be dissolved in the condense water. As can be easily understood, the uncontrolled distribution of sulphur into the atmosphere can be drastically reduced. In addition, which is well known, sulphur is in the long run very fatal to the environment.

The quantity of sulphur compounds produced each year by a heating boiler consuming 4 tons of oil with 1% sulphur content, is 40 kg, corresponding to about 80 kg sulphur acid. The sulphur acid may be neutralized in, e.g., a lime filter and to obtain such neutralization about 100 kg lime/year is required. The residue in form of hydrated calcium sulphate may without disadvantages either be used or deposited on a garbage dump.

As an average, the quantity of hydrated calcium sulphate will probably be 100-200 kg per dwelling unit. Compared with the normal annual quantity of garbage per dwelling unit, this is of little consequence.

To sum up, when using the present invention, considerable oil savings will be achieved and in addition practically no sulphur discharge into the atmosphere will take place. This corresponds to an annually oil saving of 600 tons/1000 dwelling units, a reduced sulphur discharge of 40 tons and an increased quantity of garbage coming to 160 tons.

According to the invention, a characteristic feature is seen in a condensor-heat exchanger arranged downstream of the heat consumers, a chimney gas cooler arranged in the chimney gas channel from the heating boiler, whereby said condensor-heat exchanger and said chimney gas cooler constitute parts of a closed cooling system, containing, e.g., freon gas, together with a refrigerating compressor and a throttle.

A condensate water pipe, which preferably extends from the cooler to a conventional drain or drainage system, may include a filter for neutralization of acid conditions resulting from the dissolution of sulphurous products in the condensate water. As mentioned above, a chimney gas fan may be arranged in the chimney gas channel.

In the device according to the invention, e.g., water from a water heater or from other points for hot water may be used as refrigerant.

According to a more limited embodiment of the invention, the condenser-heat exchanger may be arranged in the water return pipe of the heating boiler, whereby a re-circulating system is obtained, under the condition that the warm water from the heat consumers (radiators) is returned to the boiler.

For a better understanding, the invention will here below be described and reference will be made to the enclosed drawings, that diagrammatically illustrate a heating-plant of, e.g., a villa, provided with a device according to the invention.

Figure 1:
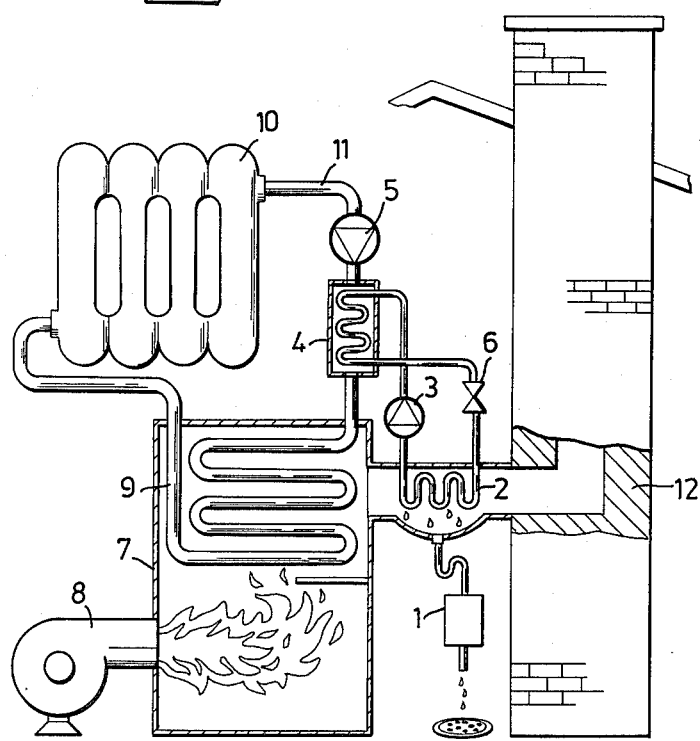
FIG. 1 is a first embodiment of the device according to the invention.

In FIG. 1, a heating boiler 7 is provided with a conventional oil burner 8 and has a heating element 9 connected to one or more radiators, of which one is illustrated at 10. The return pipe 11 from the radiator(s) 10 include a conventional circulating pump 5 and a condensor-heat exchanger 4 situated downstream the radiator(s) whereby said condensor-heat exchanger is a part of a closed cooling system, known per se, said cooling system containing e.g. freon gas. This system comprises a conventional cooling compressor 3, a chimney gas cooler 2 and a throttle or reducing valve 6. The chimney gas cooler 2 is arranged in the chimney gas channel from the heating boiler. A condensate water pipe extending from the cooling space, is connected with a filter 1.

The condensate water from the cooling space flows through the condensate water pipe, then through the filter 1 and finally into a conventional drainage. The filter 1 serves to neutralize acid, sulphurous products of the condensate, that consequently then can be led to a drainage. The chimney gas, leaving the chimney 12, is cold and almost free from sulphur compounds, meaning it contains essentially nitrogen and carbon dioxide.

When in a dwelling unit, villa or the like only warm water is wanted or available, in principle the same advantages as described above will be obtained by having the tap water from a water-heater or from other tapping points affect the condensor-heat exchanger.

Figure 2:
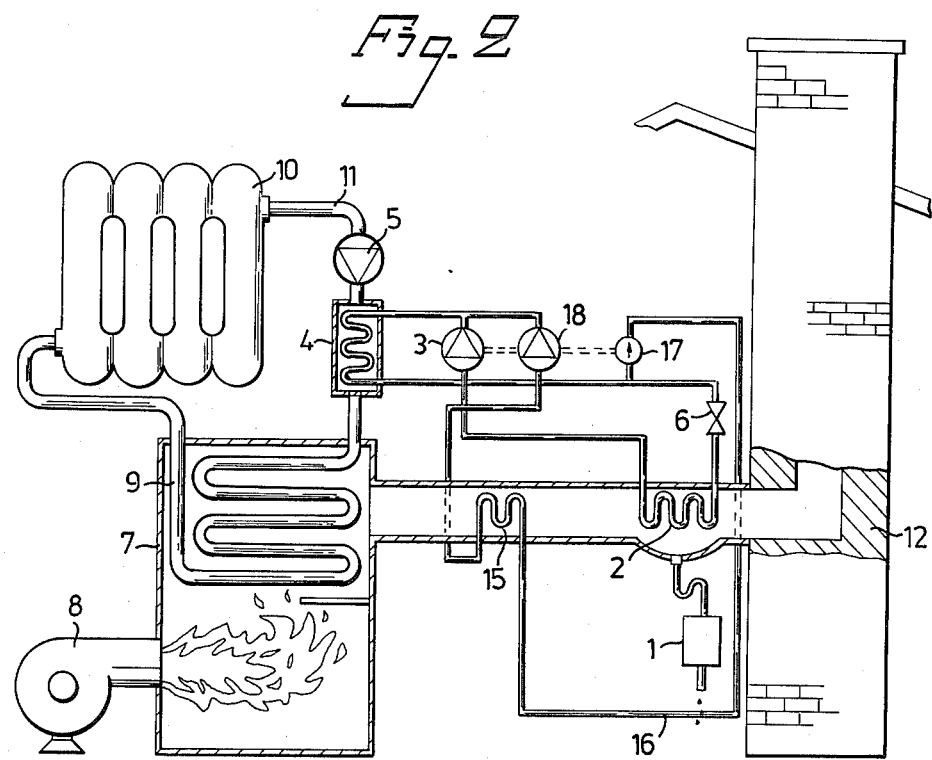
FIG. 2 is a second embodiment indicating an arrangement for utilizing the heat of the chimney gases to drive the cooling compressor.

In FIG. 2, a steam generator 15 is arranged in the closed system of the device and more specifically in the chimney gas channel from the heating boiler before the chimney gas cooler 2. Said steam generator utilizes the heat from the chimney gases to such extent, that evaporation and increase of pressure takes place and is fed over the pipe 16 and a pump 17. An expander device 18 converts in a conventional way generated pressure into mechanical energy, that via a connection 19 is supplied to the cooling compressor 3 and pump 17. Thus, the medium of the closed system, e.g. freon gas, is utilized or drive medium as well as cooling medium for the chimney gases.

The components to be included in the device according to the present invention are available on the market and the device itself may be installed in existing plants as well as incorporated in new plants.

I claim:

1. An apparatus for cooling chimney gases from a fuel heated boiler and for removing sulphurous and other pollutants from the chimney gases in a chimney from the boiler, heating water from said boiler being used in a circulating water-heating system comprised of heating radiators and a water return pipe, which comprises a cooling means in the chimney to heat up a heat-transfer medium and to cool the chimney gases; a condensor-heat exchanger means attached to the water return pipe to cool the heated heat-transfer medium and to heat the water in the water return pipe; a refrigerating compressor means located between said cooling means and said condensor-heat exchanger; and a throttle valve, said cooling means causing water to condense from said chimney gases wherein pollutants in said chimney gases are dissolved therein and said condensate water being removed by means of a condensate water pipe which contains a deacidification filter to neutralize acid condition resulting from the dissolution of pollutants in the condensate water, and in addition comprises a vapor generator feeding an expander device whereby conversion to mechanical energy takes place and said mechanical energy is employed to drive said refrigerating compressor.

2. The apparatus of claim 1 wherein the chimney contains a fan means.

3. The apparatus of claim 1 wherein the deacidification filter is a lime filter.

4. A method for cooling chimney gases from a fuel heated boiler and for removing sulphurous and other pollutants from the chimney gases in a chimney from the boiler, heating water from said boiler being used in a circulating water heating system comprised of heating radiators and a water return pipe, which comprises providing a cooling means in the chimney to heat up a heat-transfer medium to cool the chimney gases, causing the heat-transfer medium to flow to a condensor-heat exchanger means attached to the water return pipe to cool the heated heat-transfer medium and to heat the water in the water return pipe, and causing the heat-transfer medium to flow through a throttle valve back to the cooling means, whereby water condenses from said chimney gases, pollutants in said chimney gases are dissolved therein and the condensate water is removed by means of a condensate water pipe which contains a deacidification filter to neutralize acid condition resulting from dissolution of pollutants in the condensate water, and in addition comprises providing a vapor generator feeding an expander device whereby conversion to mechanical energy takes place and said mechanical energy is employed to drive said refrigerator compressor.

5. The method of claim 4 wherein the deacidification filter is a lime filter.

* * * * *